(12) United States Patent
Li et al.

(10) Patent No.: US 11,968,482 B2
(45) Date of Patent: *Apr. 23, 2024

(54) METHOD FOR DISPLAYING DYNAMIC IMAGE AND TERMINAL

(71) Applicant: HUAWEI TECHNOLOGIES CO., LTD., Guangdong (CN)

(72) Inventors: Kang Li, Shenzhen (CN); Jun Liang, Shenzhen (CN); Shilong Chen, Shenzhen (CN); Liang Xiao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,198

(22) Filed: Jul. 28, 2022

(65) Prior Publication Data

US 2022/0377298 A1 Nov. 24, 2022

Related U.S. Application Data

(63) Continuation of application No. 16/845,655, filed on Apr. 10, 2020, now Pat. No. 11,431,951, which is a (Continued)

(30) Foreign Application Priority Data

Oct. 16, 2017 (CN) .......................... 201710964267.6

(51) Int. Cl.
*H04N 9/87* (2006.01)
(52) U.S. Cl.
CPC ..................................... *H04N 9/87* (2013.01)

(58) Field of Classification Search
CPC ........ H04N 9/87; H04N 21/44; H04N 13/339; H04M 1/725; H04W 52/02; Y02D 30/70; G09G 5/12; G09G 2340/04
(Continued)

(56) References Cited

U.S. PATENT DOCUMENTS 9,160,963 B2 10/2015 Koshel et al.
2006/0028489 A1 2/2006 Jyttendaele et al.
(Continued)

FOREIGN PATENT DOCUMENTS

CN 101335945 A 12/2008
CN 102137302 A 7/2011
(Continued)

*Primary Examiner* — Thai Q Tran
*Assistant Examiner* — Nienru Yang
(74) *Attorney, Agent, or Firm* — WOMBLE BOND DICKINSON (US) LLP

(57) ABSTRACT

Embodiments of this application relate to the field of terminal technologies, and describe a method for displaying a dynamic image and a terminal, which resolve a problem that power consumption of a terminal caused by an existing method in which three-dimensional real-time rendering is used is relatively high. The method may be applied to a terminal, and can includes obtaining, from a video file based on a preset factor, a plurality of pieces of image frame data in a one-to-one correspondence to a plurality of image frames. The method may also include decoding the plurality of pieces of image frame data, to obtain the plurality of image frames. Furthermore, the method can include successively displaying the plurality of image frames obtained through the decoding, to present the dynamic image.

21 Claims, 10 Drawing Sheets

Related U.S. Application Data continuation of application No. PCT/CN2018/110287, filed on Oct. 15, 2018.

(58) Field of Classification Search
USPC .......................................................... 386/230
See application file for complete search history.

(56) References Cited

U.S. PATENT DOCUMENTS

| | | | |
|---|---|---|---|
| 2007/0046830 A1* | 3/2007 | Chen | H04N 21/4858 |
| | | | 348/559 |
| 2008/0019610 A1 | 1/2008 | Matsuzaka et al. | |
| 2008/0276173 A1 | 11/2008 | Li et al. | |
| 2010/0180049 A1 | 7/2010 | Huang et al. | |
| 2013/0038627 A1 | 2/2013 | Mujkic et al. | |
| 2017/0054906 A1 | 2/2017 | Chen et al. | |
| 2017/0214924 A1 | 7/2017 | Su | |

FOREIGN PATENT DOCUMENTS

| | | | | |
|---|---|---|---|---|
| CN | 102724492 A | 10/2012 | | |
| CN | 103473799 A | 12/2013 | | |
| CN | 104427123 A | 3/2015 | | |
| CN | 104540000 A | 4/2015 | | |
| CN | 104811797 A | 7/2015 | | |
| CN | 105120155 A | 12/2015 | | |
| CN | 105323552 A | 2/2016 | | |
| CN | 105867768 A | 8/2016 | | |
| CN | 105868223 A | 8/2016 | | |
| CN | 105975239 A | 9/2016 | | |
| CN | 106303495 A | 1/2017 | | |
| CN | 106648596 A | 5/2017 | | |
| CN | 106686452 A | 5/2017 | | |
| CN | 106951247 A | 7/2017 | | |
| CN | 107105204 A | 8/2017 | | |
| DE | 102004056445 A1 * | 5/2006 | ....... | G06F 17/30852 |
| DE | 102004056445 A1 | 5/2006 | | |
| EP | 2597885 A1 | 5/2013 | | |
| KR | 100916223 B1 | 9/2009 | | |
| WO | 2015027953 A1 | 3/2015 | | |
| WO | WO-2015027953 A1 * | 3/2015 | ............. | G06T 13/80 |

\* cited by examiner (1)

(2)

(1)

(2)

(3)

(4)

METHOD FOR DISPLAYING DYNAMIC IMAGE AND TERMINAL

CROSS-REFERENCE TO RELATED APPLICATIONS

This application is a continuation of U.S. application Ser. No. 16/845,655, filed on Apr. 10, 2020, which is a continuation of International Application No. PCT/CN2018/110287, filed on Oct. 15, 2018, which claims priority to Chinese Patent 201710964267.6, filed on Oct. 16, 2017. All of the aforementioned patent applications are hereby incorporated by reference in their entireties.

TECHNICAL FIELD

This application relates to the field of terminal technologies, and in particular, to a method for displaying a dynamic wallpaper and a terminal.

BACKGROUND

A display screen of a terminal is configured to present a graphical user interface. Using a mobile phone as an example, referring to FIG. 1, when the graphical user interface is a desktop, a background picture 11, an icon 12, of an application, overlaid on the background picture 11, and the like are usually displayed on the desktop. The background picture 11 is a wallpaper or a wallpaper image of the terminal. A wallpaper usually includes a static wallpaper and a dynamic wallpaper. The static wallpaper is usually a static picture, and a user has visual fatigue when having used the static wallpaper for a long time. However, the dynamic wallpaper can bring a dynamic effect, for example, flowing water or a swinging twig, and can provide more novel and interesting experience for the user.

Currently, when a dynamic wallpaper of a theme is created, a creator performs three-dimensional modeling on a three-dimensional object in advance, to generate a model file of the three-dimensional object. Each dynamic wallpaper is actually an application, and in this case, when an application of the dynamic wallpaper is installed on the terminal, the application imports, into the terminal, the model file and material information and the like that are needed during rendering of the model file. In this way, when displaying the dynamic wallpaper, the terminal performs three-dimensional rendering from different angles based on the model file corresponding to the dynamic wallpaper and material information needed during the rendering, to achieve a dynamic display effect. However, the rendering of the three-dimensional object is usually performed by a processing unit, such as a central processing unit (CPU) or a graphics processing unit (GPU), of the terminal, and a large amount of storage space and a large quantity of processing resources need to be consumed, causing power consumption of the terminal to be relatively high.

SUMMARY

In view of this, this application provides a method for displaying a dynamic image and a terminal, to resolve a problem in prior approaches that power consumption of a terminal caused by a method in which three-dimensional real-time rendering is used is relatively high.

According to a first aspect, a method for displaying a dynamic image is provided, and is performed by a terminal. The method includes: obtaining, from a video file based on a preset factor, a plurality of pieces of image frame data in a one-to-one correspondence to a plurality of image frames, where the dynamic image includes the plurality of image frames; decoding the plurality of pieces of image frame data, to obtain the plurality of image frames; and successively displaying the plurality of image frames obtained through the decoding, to present the dynamic image.

It can be learned that, compared with a case in prior approaches in which a dynamic image is displayed in a manner in which three-dimensional rendering is performed by using a processor such as a CPU or a GPU, the dynamic image in this embodiment of this application is a video file, and during display of the dynamic image, image frame data needing to be displayed is first obtained from the entire video file, and then the image frame data is decoded and displayed. In this way, power consumption of the terminal can be reduced.

Optionally, the preset factor includes at least one of the following factors: a time point and orientation data.

Optionally, the image frame data is decoded by using a hardware-based video decoder, to obtain at least one image frame.

Optionally, the obtained plurality of image frames are consecutive image frames.

Optionally, when the preset factor satisfies a preset change condition, the obtaining, from a video file based on a preset factor, a plurality of pieces of image frame data in a one-to-one correspondence to a plurality of image frames is performed.

In a possible embodiment, the obtaining, from a video file based on a preset factor, a plurality of pieces of image frame data in a one-to-one correspondence to a plurality of image frames includes: successively obtaining one piece of image frame data from the video file in a preset sequence based on the preset factor; correspondingly, the decoding the plurality of pieces of image frame data, to obtain the plurality of image frames includes: when obtaining one piece of image frame data each time, decoding the obtained image frame data, to successively obtain the plurality of image frames; and correspondingly, the successively displaying the plurality of image frames, to present the dynamic image includes: when obtaining one image frame through the decoding each time, displaying the obtained image frame, and successively displaying each image frame, to present the dynamic image.

In a possible embodiment, the successively displaying the plurality of image frames, to present the dynamic image includes: after displaying a first image frame, obtaining, from the video file in the preset sequence, second image frame data corresponding to a second image frame; decoding the second image frame data, to obtain the second image frame; and displaying the second image frame, and successively displaying each image frame, to present the dynamic image.

In a possible embodiment, the obtaining, from a video file based on a preset factor, a plurality of pieces of image frame data in a one-to-one correspondence to a plurality of image frames includes: standardizing a value of the preset factor, to generate one or more location parameters, where the location parameter is used for indicating locations that are in the video file and that are of the plurality of image frames; and obtaining, based on the one or more location parameters, the plurality of pieces of image frame data in a one-to-one correspondence to the plurality of image frames.

In a possible embodiment, the standardizing a value of the preset factor, to generate one or more location parameters includes: mapping the value of the preset factor to a range [0, N], where N is a quantity of image frames included in the video file; and generating the one or more location parameters based on a result after the mapping.

In a possible embodiment, the video file includes image frames representing different angles of a same three-dimensional object; the preset factor includes the orientation data; and the mapping the value of the preset factor to a range [0, N] includes:
performing normalization processing on a value of the orientation data, to obtain normalized data; and mapping the value of the orientation data to [N1, N2] based on the normalized data, where N1 represents a sequence number of an onset frame, and N2 represents a sequence number of an end frame; and the generating the one or more location parameters based on a result after the mapping includes: generating, based on [N1, N2], a location parameter that is in the video file and that is of each image frame from an $N1^{th}$ frame to an $N2^{th}$ frame.

In a possible embodiment, the orientation data includes values of the terminal on X, Y, and Z axes in a preset coordinate system; and the performing normalization processing on the orientation data, to obtain normalized data includes: performing normalization processing on the value on the X axis in the orientation data according to the following formula, to obtain normalized data:

$$\text{Normlaized data} = \frac{X \text{ axis}}{C1},$$

where C1 is a maximum value on the X axis; or performing normalization processing on the value on the Y axis in the orientation data according to the following formula, to obtain normalized data:

$$\text{Normlaized data} = \frac{Y \text{ axis}}{C2},$$

where C2 is a maximum value on the Y axis; or performing normalization processing on the value on the Z axis in the orientation data according to the following formula, to obtain normalized data:

$$\text{Normlaized data} = \frac{Z \text{ axis}}{C3},$$

where C3 is a maximum value on the Z axis.

In a possible embodiment, the orientation data further includes a deviation angle that is of the terminal and that is from the preset coordinate axes in the preset coordinate system. The performing normalization processing on the orientation data, to obtain normalized data includes: performing normalization processing on the deviation angle according to the following formula, to obtain normalized data:

$$\text{Normlaized data} = \frac{\text{Deviation angle}}{C4},$$

where C4 is a maximum value of the deviation angle.

In a possible embodiment, the orientation data is obtained by a motion sensor of the terminal, and the motion sensor includes either of the following sensors: a gyroscope and a gravity sensor.

In a possible embodiment, the video file includes image frames representing different time points; the preset factor includes a system time of the terminal; the mapping the value of the preset factor to a range [0, N] includes: performing normalization processing on a value of the system time according to the following formula, to obtain normalized data:

$$\text{Normlaized data} = \frac{\text{System time}}{C5},$$

where C5 is a maximum value of the system time; mapping the value of the system time to [N3, N4] based on the normalized data, where N3 represents a sequence number of an onset frame, and N4 represents a sequence number of an end frame; and the generating the one or more location parameters based on a result after the mapping includes: generating, based on [N3, N4], a location parameter that is in the video file and that is of each image frame from an $N3^{th}$ frame to an $N4^{th}$ frame.

According to a second aspect, a terminal is provided, and includes: a processor, a memory, a display, a video decoder, and a bus, where the processor, the memory, the display, and the video decoder communicate with each other by using the bus, where the memory stores one or more pieces of program code and at least one video file that is used for implementing a dynamic image; the one or more pieces of program code include an instruction; and when the instruction is executed by the processor, the terminal is enabled to perform the following steps: obtaining, by the processor, from a video file based on a preset factor, a plurality of pieces of image frame data in a one-to-one correspondence to a plurality of image frames, where the dynamic image includes the plurality of image frames, and the preset factor includes at least one of the following factors: a time point and orientation data; decoding, by the video decoder, the plurality of pieces of image frame data, to obtain the plurality of image frames; and successively displaying, by the display, the plurality of image frames obtained through the decoding, to present the dynamic image.

In a possible embodiment, the processor is specifically configured to successively obtain one piece of image frame data from the video file in a preset sequence based on the preset factor; the video decoder is specifically configured to: when obtaining one piece of image frame data each time, decode the obtained image frame data, to successively obtain the plurality of image frames; and the display is specifically configured to: when obtaining one image frame through the decoding each time, display the obtained image frame, and successively display each image frame, to present the dynamic image.

In a possible embodiment, the processor is specifically configured to: after the display displays a first image frame, obtain, from the video file in the preset sequence, second image frame data corresponding to a second image frame; the video decoder is specifically configured to decode the second image frame data, to obtain the second image frame; and the display is specifically configured to display the second image frame, and successively display each image frame, to present the dynamic image.

In a possible embodiment, the processor is specifically configured to standardize a value of the preset factor, to generate one or more location parameters, where the location parameter is used for indicating locations that are in the video file and that are of the plurality of image frames; and obtain, based on the one or more location parameters, the plurality of pieces of image frame data in a one-to-one correspondence to the plurality of image frames.

In a possible embodiment, the processor is further specifically configured to: map the value of the preset factor to a range [0, N], where N is a quantity of image frames included in the video file; and generate the one or more location parameters based on a result after the mapping.

In a possible embodiment, the video file includes image frames representing different angles of a same three-dimensional object; and the preset factor includes the orientation data. The processor is further configured to: perform normalization processing on a value of the orientation data, to obtain normalized data; map the value of the orientation data to [N1, N2] based on the normalized data, where N1 represents a sequence number of an onset frame, and N2 represents a sequence number of an end frame; and generate, based on [N1, N2], a location parameter that is in the video file and that is of each image frame from an $N1^{th}$ frame to an $N2^{th}$ frame.

According to the embodiments discussed herein, when a user holds the terminal by hand in different postures, the orientation data of the terminal changes accordingly, and a video file segment needing to be displayed on the terminal also changes accordingly. In other words, a currently displayed image frame is continuously switched as the orientation data of the terminal changes, and an effect of the dynamic image is achieved.

In a possible embodiment, the orientation data includes values of the terminal on X, Y, and Z axes in a preset coordinate system. The processor is further configured to perform normalization processing on the value on the X axis in the orientation data according to the following formula, to obtain normalized data:

$$\text{Normlaized data} = \frac{X \text{ axis}}{C1},$$

where C1 is a maximum value on the X axis; or perform normalization processing on the value on the Y axis in the orientation data according to the following formula, to obtain normalized data:

$$\text{Normlaized data} = \frac{Y \text{ axis}}{C2},$$

where C2 is a maximum value on the Y axis; or perform normalization processing on the value on the Z axis in the orientation data according to the following formula, to obtain normalized data:

$$\text{Normlaized data} = \frac{Z \text{ axis}}{C3},$$

where C3 is a maximum value on the Z axis.

In a possible embodiment, the orientation data further includes a deviation angle that is of the terminal and that is from the preset coordinate axes in the preset coordinate system. The processor is further configured to perform normalization processing on the deviation angle according to the following formula, to obtain normalized data:

$$\text{Normlaized data} = \frac{\text{Deviation angle}}{C4},$$

where C4 is a maximum value of the deviation angle.

In a possible embodiment, the orientation data is obtained by a motion sensor of the terminal, and the motion sensor includes either of the following sensors: a gyroscope and a gravity sensor.

In a possible embodiment, the video file includes image frames representing different time points; and the preset factor includes a system time of the terminal. The processor is further configured to: perform normalization processing on a value of the system time according to the following formula, to obtain normalized data:

$$\text{Normlaized data} = \frac{\text{System time}}{C5},$$

where C5 is a maximum value of the system time; map the value of the system time to [N3, N4] based on the normalized data, where N3 represents a sequence number of an onset frame, and N4 represents a sequence number of an end frame; and generate, based on [N3, N4], a location parameter that is in the video file and that is of each image frame from an $N3^{th}$ frame to an $N4^{th}$ frame.

According to embodiments discussed herein, image frame data that needs to be displayed and that is obtained by the terminal changes as time data changes (for example, in a forenoon, at noon, in an afternoon, and at night), and different image frames are presented, achieving the effect of the dynamic image.

In a possible embodiment, the video decoder is a hardware-based video decoder.

In a possible embodiment, the plurality of image frames obtained by the processor are consecutive image frames.

In a possible embodiment, the processor is further configured to: when the preset factor satisfies a preset change condition, obtain, from the video file based on the preset factor, the plurality of pieces of image frame data in a one-to-one correspondence to the plurality of image frames.

According to a third aspect, a terminal is provided, and includes a storage unit, a processing unit, a display unit, and a decoding unit. The storage unit is configured to store at least one dynamic image, and each dynamic image corresponds to at least one video file. The processing unit is configured to obtain, from a video file based on a preset factor, a plurality of pieces of image frame data in a one-to-one correspondence to a plurality of image frames, where the dynamic image includes the plurality of image frames, and the preset factor includes at least one of the following factors: a time point and orientation data. The decoding unit is configured to decode the plurality of pieces of image frame data, to obtain the plurality of image frames. The display unit is configured to successively display the plurality of image frames obtained through the decoding, to present the dynamic image.

In a possible embodiment, the processing unit is further specifically configured to successively obtain one piece of image frame data from the video file in a preset sequence based on the preset factor. The decoding unit is further specifically configured to: when obtaining one piece of image frame data each time, decode the obtained image frame data, to successively obtain the plurality of image frames. The display unit is further specifically configured to: when obtaining one image frame through the decoding each time, display the obtained image frame, and successively display each image frame, to present the dynamic image.

In a possible embodiment, the processing unit is specifically configured to: after the display unit displays a first image frame, obtain, from the video file in the preset sequence, second image frame data corresponding to a second image frame; the decoding unit is specifically configured to decode the second image frame data, to obtain the second image frame; and the display unit is specifically configured to display the second image frame, and successively display each image frame, to present the dynamic image.

In a possible embodiment, the processing unit is specifically configured to standardize a value of the preset factor, to generate one or more location parameters, where the location parameter is used for indicating locations that are in the video file and that are of the plurality of image frames; and obtain, based on the one or more location parameters, the plurality of pieces of image frame data in a one-to-one correspondence to the plurality of image frames.

In a possible embodiment, the processing unit is further specifically configured to: map the value of the preset factor to a range [0, N], where N is a quantity of image frames included in the video file; and generate the one or more location parameters based on a result after the mapping.

In a possible embodiment, the video file includes image frames representing different angles of a same three-dimensional object; and the preset factor includes the orientation data. The processing unit is further configured to: perform normalization processing on a value of the orientation data, to obtain normalized data; map the value of the orientation data to [N1, N2] based on the normalized data, where N1 represents a sequence number of an onset frame, and N2 represents a sequence number of an end frame; and generate, based on [N1, N2], a location parameter that is in the video file and that is of each image frame from an N1$^{th}$ frame to an N2$^{th}$ frame.

In a possible embodiment, the orientation data includes values of the terminal on X, Y, and Z axes in a preset coordinate system. The processing unit is further configured to perform normalization processing on the value on the X axis in the orientation data according to the following formula, to obtain normalized data:

$$\text{Normlaized data} = \frac{X \text{ axis}}{C1},$$

where C1 is a maximum value on the X axis; or perform normalization processing on the value on the Y axis in the orientation data according to the following formula, to obtain normalized data:

$$\text{Normlaized data} = \frac{Y \text{ axis}}{C2},$$

where C2 is a maximum value on the Y axis; or perform normalization processing on the value on the Z axis in the orientation data according to the following formula, to obtain normalized data:

$$\text{Normlaized data} = \frac{Z \text{ axis}}{C3},$$

where C3 is a maximum value on the Z axis.

In a possible embodiment, the orientation data further includes a deviation angle that is of the terminal and that is from the preset coordinate axes in the preset coordinate system. The processing unit is further configured to perform normalization processing on the deviation angle according to the following formula, to obtain normalized data:

$$\text{Normlaized data} = \frac{\text{Deviation angle}}{C4},$$

where C4 is a maximum value of the deviation angle.

In a possible embodiment, the orientation data is obtained by a motion sensor of the terminal, and the motion sensor includes either of the following sensors: a gyroscope and a gravity sensor.

In a possible embodiment, the video file includes image frames representing different time points; and the preset factor includes a system time of the terminal. The processing unit is further configured to: perform normalization processing on a value of the system time according to the following formula, to obtain normalized data:

$$\text{Normalized data} = \frac{\text{System time}}{C5},$$

where C5 is a maximum value of the system time; map the value of the system time to [N3, N4] based on the normalized data, where N3 represents a sequence number of an onset frame, and N4 represents a sequence number of an end frame; and generate, based on [N3, N4], a location parameter that is in the video file and that is of each image frame from an N3$^{th}$ frame to an N4$^{th}$ frame.

In a possible embodiment, the plurality of image frames obtained by the processing unit are consecutive image frames.

In a possible embodiment, the processing unit is further configured to: when the preset factor satisfies a preset change condition, obtain, from the video file based on the preset factor, the plurality of pieces of image frame data in a one-to-one correspondence to the plurality of image frames.

According to a fourth aspect, a computer readable storage medium is provided. The computer readable storage medium stores an instruction. When the instruction is run on a terminal, the terminal is enabled to perform the method for displaying a dynamic image according to the first aspect.

According to a fifth aspect, a computer program product including an instruction is provided. When the computer program product is run on a terminal, the terminal is enabled to perform the method for displaying a dynamic image according to the first aspect.

It may be understood that, the terminal according to the second aspect and the third aspect, the computer storage medium according to the third aspect, and the computer program product according to the fifth aspect that are provided above are all configured to perform the corresponding method provided in the first aspect. Therefore, for beneficial effects that they can achieve, refer to beneficial effects in the corresponding method provided above. Details are not described herein again.

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of embodiments of this application, unless otherwise stated, "multiple" means two or more than two.

Currently, during display of a dynamic wallpaper, a terminal performs three-dimensional rendering based on a pre-stored model file and material information that is needed during the rendering, to dynamically display the wallpaper. In the three-dimensional rendering method, a large amount of storage space and a large quantity of processing resources of the terminal need to be consumed, causing power consumption of the terminal to be relatively high. To reduce the power consumption of the terminal during the display of the dynamic wallpaper, the embodiments of this application provide a method for displaying a dynamic image. The method may be applied to any terminal including a video decoding unit, for example, a mobile phone, a wearable device, an augmented reality (AR)/virtual reality (VR) device, a tablet computer, a personal digital assistant (PDA), an in-vehicle terminal, or a television set.

It should be noted that, the dynamic image described in the embodiments of this application includes not only a wallpaper displayed on a lock screen interface, but also a wallpaper displayed on a main interface after unlock.

Figure 1:
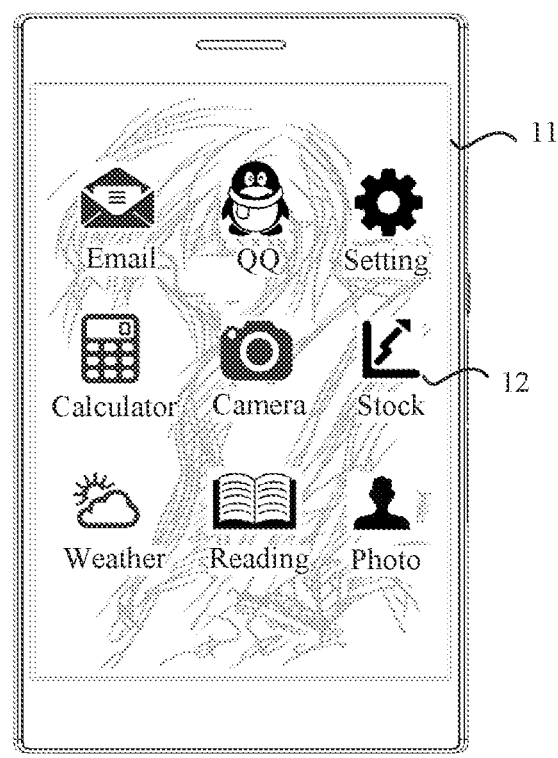
FIG. 1 is a schematic diagram of a wallpaper on a terminal.
Figure 2:
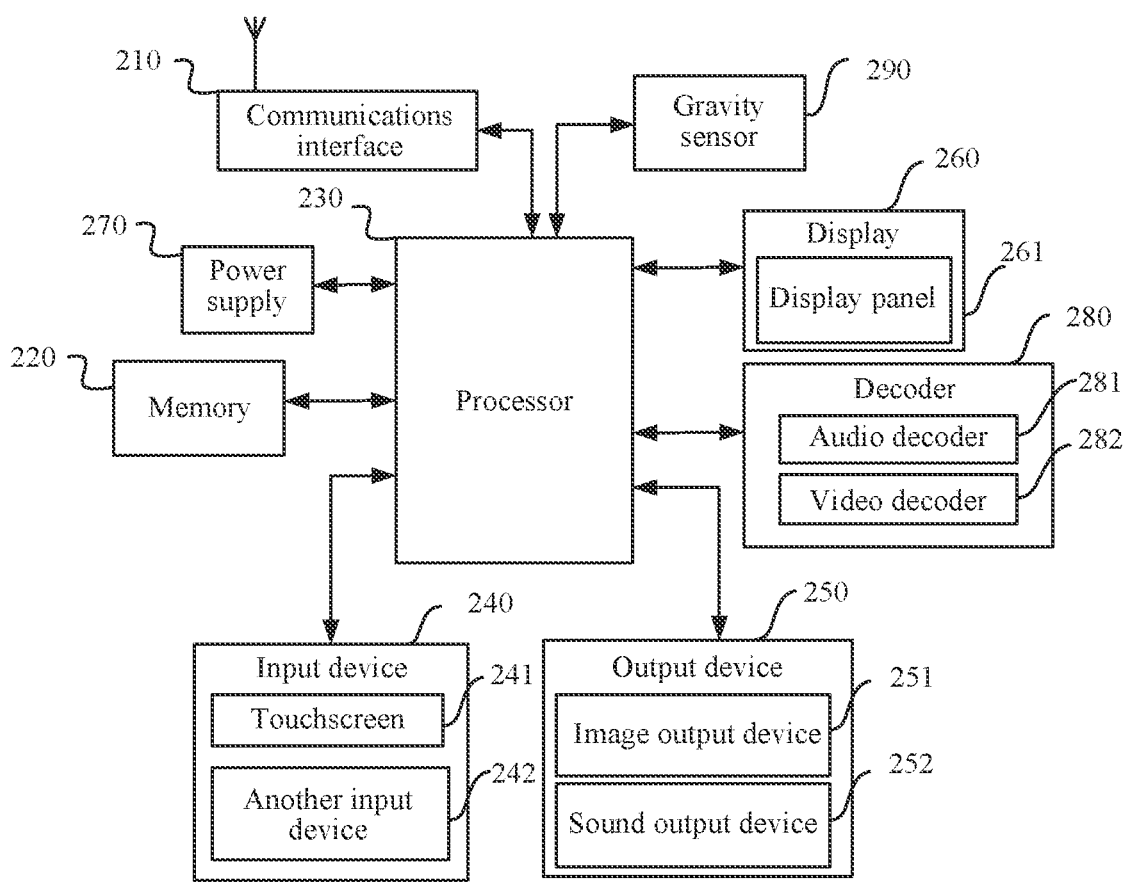
FIG. 2 is a schematic structural diagram of a terminal according to an embodiment of this application.

Referring to FIG. 2, the terminal 200 in an embodiment of this application includes parts such as a communications interface 210, a memory 220, a processor 230, an input device 240, an output device 250, a display 260, a power supply 270, and a decoder 280. These parts are connected to each other by using one or more buses. A person skilled in the art may understand that a structure of the terminal shown in FIG. 2 does not constitute a limitation on the terminal, and the terminal may include more components or fewer components than those shown in the figure, or some components may be combined, or a different component deployment may be used. The following separately describes functional components of the terminal 200:

The communications interface 210 is configured to establish a communications channel, so that the terminal communicates with another terminal through the communications channel. For example, the communications interface 210 includes a wireless local area network (WLAN) module, a Bluetooth (BT) module, a base band (BB) module, and the like. The WLAN module is used by the terminal to perform wireless local area network communication; the Bluetooth module is used by the terminal to perform Bluetooth communication; and the base band module is used for information receiving and sending, and configured to receive and send a signal in a call process. For example, after receiving downlink information of a base station, the base band module sends the downlink information to the processor 230 for processing. In addition, the base band module may further send uplink data to the base station. Usually, the base band module is implemented by a radio frequency circuit, including a known circuit configured to perform these functions, and includes but is not limited to, an antenna system, a radio frequency transceiver, one or more amplifiers, a tuner, one or more oscillators, a digital signal processor, a codec chip group, a subscriber identity module (SIM) card, a memory, or the like. In addition, the terminal may further communicate with a network and another device through wireless communication provided by the base band module. The wireless communication may use any communication standard or protocol, including but not limited to, global system for mobile communications (GSM), general packet radio service (GPRS), code division multiple access (CDMA), wideband code division multiple access (WCDMA), a high speed uplink packet access technology (HSUPA), long term evolution (LTE), email, short message service (SMS), or the like.

The memory 220 may be configured to store a software program and a module, and the processor 230 runs the software program and the module that are stored in the memory 220, to perform various functional applications of the terminal 200 and data processing. The memory 220 may mainly include a program storage area and a data storage area. The program storage area may store an operating system, an application (APP) required by at least one function (such as a sound playing function and an image display function), and the like. The data storage area may store data (such as audio data, image data, and an address book) created based on use of the terminal 200, and the like. The operating system may be the Android™ system developed by Google Inc., an iOS™ system developed by Apple Inc., the Windows™ operating system developed by Microsoft Inc., or the like, or may be an embedded operating system such as VxWorks™. The application includes any application installed on the terminal, including but not limited to, a browser, email, an instant messaging service, word processing, keyboard virtualization, a widget, music play, and the like. In addition, the memory 220 may include a high speed random access memory, and may further include a non-volatile memory, such as at least one magnetic disk storage device, a flash memory device, or another volatile solid-state storage device.

In the terminal provided in this embodiment of this application, the memory 220 stores at least one dynamic image. Each dynamic image may be considered as an application, and when a dynamic image is displayed, it may be considered that an application corresponding to the dynamic image is run. In this embodiment of this application, each dynamic image corresponds to at least one video file. The video file is a digital video signal obtained by processing an analog video signal by using a compression coding technology. For example, the video file may be a video file in a format such as an MP4 format, MOV, 3GP, RM, RMVB, or AVI. Optionally, as a dynamic image, the video file may be obtained in the following manner: When creating the dynamic image, a developer shoots a three-dimensional object in a specific sequence from different angles in advance, to obtain the video file. For example, the three-dimensional object is shot in a sequence of from top to bottom or from left to right, to obtain the video file. Alternatively, the video file may be obtained in the following manner: The developer composes a plurality of pictures of different time points and different weather conditions into one video file, and uses the video file as the dynamic image. Alternatively, the video file may be any video file. Certainly, the terminal may store dynamic images of different themes, and a user may select a dynamic image of a theme as a dynamic image currently needing to be displayed, or the terminal automatically displays, on the display 260, a dynamic image of a theme as a default wallpaper.

The processor 230 is a control center of the terminal 200, and is connected to all the parts of the entire terminal by using various interfaces and wires. By running or executing the software program and/or module stored in the memory 220, and invoking data stored in the memory 220, the processor 230 performs various functions of the terminal 200 and processes data, thereby performing overall monitoring on the terminal. Optionally, the processor 230 may include one or more processing units. Optionally, an application processor and a modem processor may be integrated in the processor 230, and a GPU may be further integrated in the processor 230. The application processor mainly processes an operating system, a user interface, an application, and the like. The modem processor mainly processes wireless communication. The GPU is mainly used for image operation and processing work of the terminal, for example, configured to: convert and drive information needing to be displayed on the terminal, and provide a line scan signal to the display 260, to control the display 260 to perform correct display. It may be understood that the foregoing modem processor and/or GPU may alternatively not be integrated into the processor 230.

The input device 240 may be configured to: receive digit or character information entered by the user, and generate a key signal input related to a user setting and function control of the terminal 200. Specifically, the input device 240 may include a touchscreen 241 and another input device 242. The touchscreen 241, also referred to as a touch panel, may collect a touch operation of the user on or near the touchscreen (such as an operation performed by the user on or near the touchscreen 241 by using any suitable object or accessory such as a finger or a stylus), and drive a corresponding connection apparatus based on a preset program. Optionally, the touchscreen 241 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into contact coordinates, and sends the contact coordinates to the processor 230. Moreover, the touch controller can receive and execute a command sent from the processor 230. In addition, the touchscreen 241 may be implemented in various types such as resistance-type, capacitance-type, infrared, and surface acoustic wave. The input device 240 may further include the another input device 242 in addition to the touchscreen 241. Specifically, the another input device 242 may include, but is not limited to, one or more of a physical keyboard, a functional key (such as a volume control key or a power switch key), a trackball, a mouse, a joystick, or the like.

The output device 250 includes, but is not limited to, an image output device 251 and a sound output device 252. The image output device is configured to output a text, a picture, and/or a video. The image output device may include a display panel, for example, a display panel configured in a form of a liquid crystal display (LCD), an organic light-emitting diode (OLED), a field emission display (FED), or the like. Alternatively, the image output device may include a reflective display, for example, an electrophoretic display, or a display using an interferometric modulation of light technology. The image output device may include a single display or a plurality of displays of different sizes. The sound output device is configured to output audio. For example, the sound output device includes an audio circuit, a speaker, and a microphone, to provide an audio interface between the user and the terminal 200. Specifically, the audio circuit may transmit, to the speaker, a received electrical signal converted from audio data, and the speaker converts the electrical signal into a sound signal for outputting. Certainly, the microphone may further convert a collected sound signal into an electrical signal. The audio circuit receives the electrical signal, coverts the electrical signal into audio data, and outputs the audio data to the communications interface 210 to send the audio data to another terminal, or outputs the audio data to the memory 220 for further processing.

In an embodiment of this application, the touchscreen 241 used by the input device 240 may also be used as a display panel of the output device 250. For example, after detecting a touch on the touch panel or a gesture operation near the touch panel, the touchscreen 241 transmits the touch or gesture operation to the processor 230 to determine a type of a touch event, and subsequently, the processor 230 provides a corresponding visual output on the display panel based on the type of the touch event. Although in FIG. 2, the input device 240 and the output device 250 are used as two independent parts to implement an input function and an output function of the terminal, in some embodiments, the touch panel and the display panel may be integrated to implement the input function and the output function of the terminal. For example, the image output device may display various graphical user interfaces (Graphical User Interface, GUI) as virtual control components, including but not limited to, a window, a scroll bar, an icon, and a clipboard, for the user to perform an operation through touch control.

The display 260 may be configured to display information entered by the user or information provided for the user, and various menus of the terminal 200. The display 260 may include a display panel 261. Optionally, the display panel 261 may be configured by using a liquid crystal display (LCD), an organic light-emitting diode (OLED), or the like. Further, the touchscreen 241 may cover the display panel 261. After detecting a touch operation on or near the touchscreen 241, the touchscreen 241 transfers the touch operation to the processor 230 to determine a type of a touch event. Subsequently, the processor 230 provides a corresponding visual output on the display panel 261 based on the type of the touch event. Although in FIG. 2, the touchscreen 241 and the display panel 261 are used as two independent parts to implement an input function and an input function of the terminal 200, in some embodiments, the touchscreen 241 and the display panel 261 may be integrated to implement the input function and the output function of the terminal 200.

The terminal 200 further includes a power supply 270 (such as a battery) supplying power to the parts. As a general understanding, the power supply may be a built-in battery, for example, a common lithium-ion battery or NiMH battery, or may be an external power supply directly supplying power to the terminal, for example, a power adapter. In some implementations of this application, the power supply may alternatively be more widely defined, and for example, may further include a power supply management system, a charging system, a power supply fault detection circuit, a power supply converter or an inverter, a power supply status indicator (for example, a light emitting diode), and any other component associated with generation, management, and distribution of electric energy of the terminal. Optionally, the power supply 270 may be logically connected to the processor 230 by using a power management system, thereby implementing functions such as charging, discharging, and power consumption management by using the power management system.

The terminal 200 further includes the decoder 280. Audio and video data stored on the terminal such as a mobile phone is usually a digital audio and video signal obtained by compressing and encoding an analog audio and video signal. Therefore, to play an audio and video file, a digital audio and video file needs to be decoded by using the decoder 280, and then converted into an analog audio and video signal. The decoder 280 specifically includes an audio decoder 281 and a video decoder 282. The audio decoder 281 may use the processor 230 to implement an audio decoding function by running a software program, or may use special audio decoding hardware (such as an audio decoding chip or an audio decoder) to implement an audio decoding function. Similarly, the video decoder 282 may use the processor 230 to implement a video decoding function by running a software program, or may use special video decoding hardware to implement a video decoding function. When the processor 230 completes an audio and video decoding process by using a software program, the decoding process is considered as soft decoding. When an audio and video decoding process is completed by using hardware such as a special audio and video decoding chip, the decoding process is hard decoding. For example, hardware for implementing hard decoding of a video may be: an application-specific integrated circuit (ASIC) chip configured to implement video decoding, or a digital signal processing (DSP) chip configured to implement video decoding.

The terminal 200 further includes a gravity sensor 290. The gravity sensor 290 can detect magnitude of accelerations of the terminal in directions (usually on three axes), can detect magnitude and a direction of gravity when being static, and may be used for applications for identifying a terminal posture (such as screen switching between a landscape mode and a portrait mode, a related game, and magnetometer posture calibration), and functions related to vibration recognition (such as a pedometer and tapping). Certainly, the terminal 200 may further include another sensor, although not shown, for example, a fingerprint recognition sensor, a human face recognition sensor, or an iris recognition sensor that is configured to perform biometric feature recognition. For another example, the sensor further includes a light sensor. Specifically, the light sensor may include an ambient light sensor and an optical proximity sensor. The ambient light sensor can adjust luminance of the display panel 261 based on brightness of ambient light. The optical proximity sensor may detect whether an object approaches or touches the terminal, and may disable the display panel 261 and/or backlight when the terminal 200 moves to be close to an ear. Another sensor such as a gyroscope, a barometer, a hygrometer, a thermometer, or an infrared sensor may be further configured in the terminal 200. Details are not described herein again.

Methods provided in the following embodiments may be applied to the terminal shown in FIG. 2. As described above, the memory 220 of the terminal stores one or more pieces of program code, and at least one corresponding video file for implementing each dynamic image. The one or more pieces of program code include an instruction. When the instruction is executed by the processor 230, the terminal 200 may perform the methods for displaying a dynamic image provided in the embodiments of this application.

Figure 3:
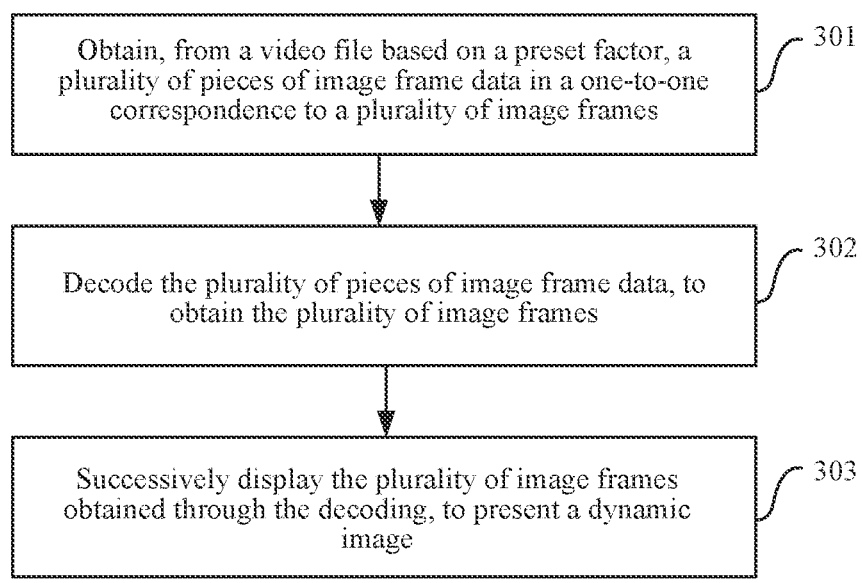
FIG. 3 is a schematic flowchart of a method that is for displaying a dynamic image and that is applied to the terminal shown in FIG. 2 according to an embodiment of this application.

Referring to FIG. 3, during display of a dynamic image, a method according to an embodiment of this application includes the following steps.

301: Obtain, from a video file based on a preset factor, a plurality of pieces of image frame data in a one-to-one correspondence to a plurality of image frames.

The dynamic image includes the plurality of image frames. The plurality of pieces of image frame data are data obtained by compressing and encoding the plurality of image frames included in the dynamic image. Therefore, the plurality of pieces of image frame data may alternatively be understood as image frame code streams including the plurality of image frames. Assuming that the video file includes M image frames, the plurality of pieces of image frame data correspond to N image frames in the M image frames. A value of N is greater than or equal to 1 and less than or equal to M. Therefore, it may be understood as that the plurality of pieces of image frame data are a part of the video file, in other words, the plurality of pieces of image frame data are video segments in the video file.

Optionally, the preset factor includes at least one of the following factors: orientation data of a terminal, time data, and weather data that is obtained by the terminal. The orientation data of the terminal may be obtained by a motion sensor in the terminal. The motion sensor includes various sensors that can obtain the orientation data of the terminal, for example, a gravity sensor, an accelerometer, a gyroscope, and a compass (or a magnetometer). The orientation data may be obtained by a single type of sensor, or the orientation data of the terminal may be obtained by a combination of a plurality of sensors by using a sensor fusion algorithm. The time data of the terminal is a system time of the terminal. The weather data obtained by the terminal may be usually obtained from a server when the terminal is connected to the Internet. For example, when a weather application is installed on the terminal, the terminal may obtain the weather data from a server corresponding to the weather application.

After the plurality of pieces of image frame data are obtained in step 301, the following steps 302 and 303 are performed to decode and display the plurality of pieces of image frame data.

302: Decode the plurality of pieces of image frame data, to obtain the plurality of image frames.

During specific implementation of the step, the decoding may be performed through soft decoding or hard decoding. The soft decoding means that the decoding is performed by a processor by running a software program. The hard decoding means that the decoding is performed by using special hardware, such as an ASIC or a DSP. Compared with the soft decoding, the hard decoding implements video decoding by using special hardware other than the processor, so that power consumption of the processor can be reduced.

303: Successively display the plurality of image frames obtained through the decoding, to present the dynamic image.

Optionally, in an implementation of step 301, step 302, and step 303, the plurality of pieces of image frame data may be obtained and decoded at a time, these image frames are placed in a cache, and then all the image frames are successively read from the cache and then displayed.

Figure 4:
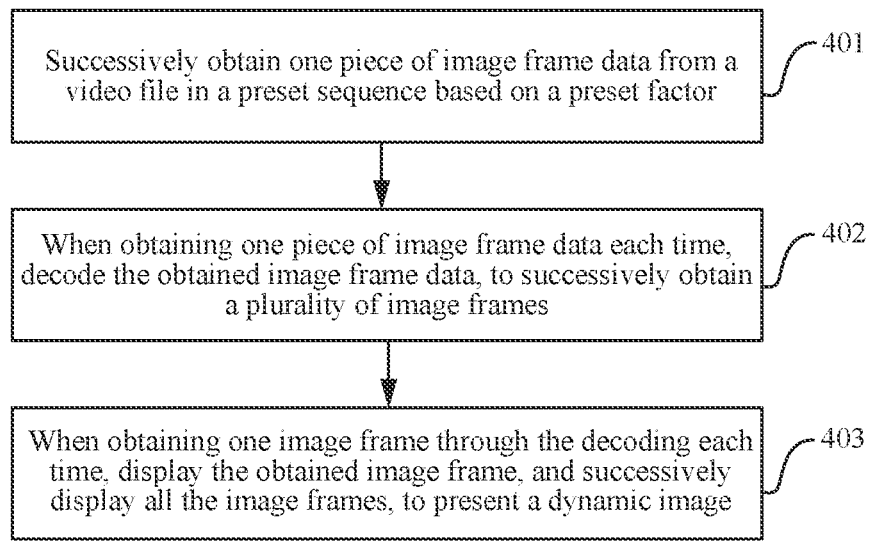
FIG. 4 is a schematic flowchart of another method that is for displaying a dynamic image and that is applied to the terminal shown in FIG. 2 according to an embodiment of this application.

In another implementation of step 302 and step 303, referring to FIG. 4, the following steps may be specifically included:

401: Successively obtain one piece of image frame data from the video file in a preset sequence based on the preset factor.

402: When obtaining one piece of image frame data each time, decode the obtained image frame data, to successively obtain the plurality of image frames.

403: When obtaining one image frame through the decoding each time, display the obtained image frame, and successively display all the image frames, to present the dynamic image.

Optionally, the foregoing step 401 to step 403 include an implementation 1: Serial processing of the image frame data: After a first image frame is displayed, second image frame data corresponding to a second image frame is obtained from the video file in the preset sequence; the second image frame data is decoded, to obtain the second image frame; the second image frame is displayed, and all the image frames are successively displayed, to present the dynamic image; after one piece of image frame data is obtained each time, one image frame is decoded, the image frame is displayed, and then a next image frame is decoded and displayed; and a "decoding-display" process is cycled, until all the image frames are decoded and displayed. When this processing manner is used, occupied memory space is relatively small.

Alternatively, the foregoing step 401 to step 403 include an implementation 2: Concurrent processing of the image frame data: When a first image frame obtained by decoding first image frame data is displayed, second image frame data is decoded at the same time, and a second image frame is displayed after the first image frame is displayed.

Certainly, in the foregoing method, a specific image frame or specific image frames included in the image frame data obtained each time is determined by using a value of the preset factor. Therefore, when the value of the preset factor changes, the obtained image frame data is also different, and image frames decoded and displayed in step 302 and step 303 are also different, presenting an effect of the dynamic image.

For example, when the preset factor is the orientation data of the terminal, and a user holds the terminal by hand in different postures, the orientation data of the terminal changes accordingly, and a dynamic image needing to be displayed on the terminal also changes accordingly. In other words, a currently displayed image frame is continuously switched as the orientation data of the terminal changes, and the effect of the dynamic image is achieved. For another example, when the preset factor is the time data of the terminal, image frame data that needs to be displayed and that is obtained by the terminal changes as the time data changes (for example, 9 o'clock, 12 o'clock, 15 o'clock, and 18 o'clock), and an image frame displayed after being decoded also continuously changes, achieving the effect of the dynamic image. For still another example, when the preset factor is the weather data obtained by the terminal, an image frame currently displayed on the terminal changes as the weather data changes (for example, overcast, sunny, and rainy), to continuously switch the currently displayed image frame, and achieve the effect of the dynamic image.

It can be learned that, compared with prior approaches in which a dynamic image is displayed in a manner in which three-dimensional rendering is performed by using a processor such as a CPU or a GPU, a dynamic image in the embodiments of this application is a video file, and when the dynamic image is displayed by using the foregoing method provided in the embodiments of this application, a plurality of pieces of image frame data needing to be displayed are first obtained from the entire video file, and then the plurality of pieces of image frame data are decoded and displayed, so that the power consumption of the terminal can be reduced.

Currently, there are a plurality of types of video compression and encoding technologies, and different types of encoded frames can be obtained by using different technologies. For example, the encoded frames include an intra picture that is referred to as an I frame for short, a predictive frame that is referred to as a P frame for short, a bi-directional interpolated prediction frame that is referred to as a B frame for short. Display manners of different types of encoded frames are different. For example, for an encoded frame of an I frame type, when a frame of image is displayed, only this frame may be decoded and displayed. For an encoded frame of a P frame type, when a frame of image is displayed, a related frame adjacent to this frame needs to be used for reference, and therefore a plurality of frames need to be decoded and displayed. For specific implementation of the foregoing I frame, P frame, and the like, refer to the prior art. Details are not described herein.

When the plurality of pieces of image frame data are obtained, after image frames corresponding to the image frame data are determined, these frames may be found based on an encoding rate. For example, to find image frame data corresponding to an $X^{th}$ frame to an $(X+2)^{th}$ frame, after conversion is performed based on the encoding rate, a video segment from a $Y1^{th}$ second to a $Y2^{th}$ second in a first video file may be used as image frame data needing to be obtained. For specific implementation thereof, refer to the prior art. Details are not described herein.

Figure 5:
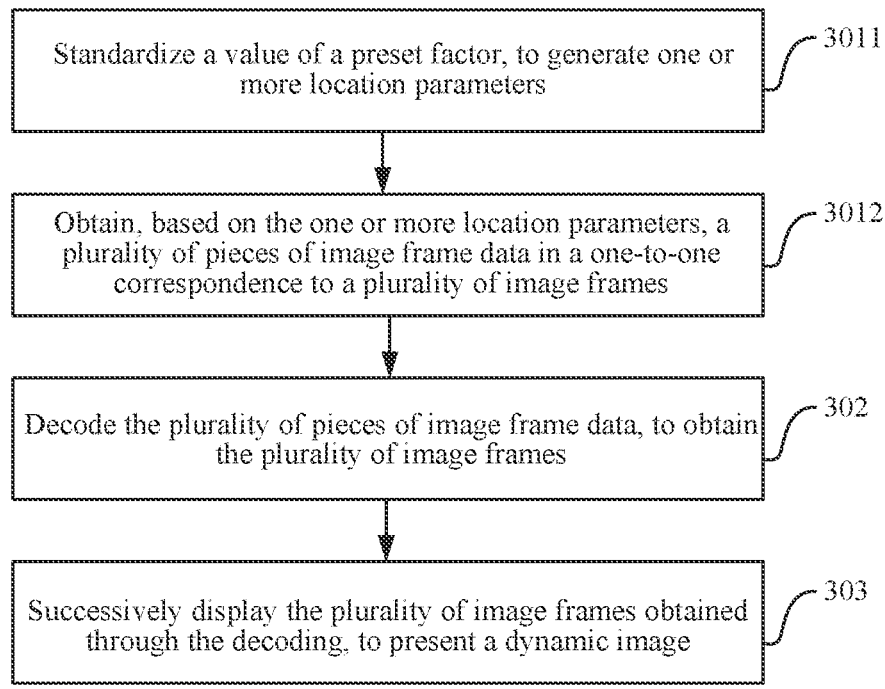
FIG. 5 is a schematic flowchart of still another method that is for displaying a dynamic image and that is applied to the terminal shown in FIG. 2 according to an embodiment of this application.

Optionally, referring to FIG. 5, an embodiment of step 301 may be implemented as follows:

3011: Standardize a value of the preset factor, to generate one or more location parameters.

The location parameter is used for indicating locations that are in the video file and that are of the plurality of image frames.

3012: Obtain, based on the one or more location parameters, the plurality of pieces of image frame data in a one-to-one correspondence to the plurality of image frames.

In step 3011, the standardization means performing normalization processing on the value of the preset factor, to obtain normalized data in a range [−1, 1] or [0, 1]. Then, frames to be obtained, namely, frames to be mapped to a range [0, N], are determined based on the normalized data. N is a quantity of image frames included in the video file. To be specific, step 3011 is specifically mapping the value of the preset factor to the range [0, N], and generating the one or more location parameters based on a result after the mapping, where N is the quantity of image frames included in the video file.

An implementation of step 3011 and step 3012 varies based on different preset factors. The following separately describes several possible embodiments of step 3011 and step 3012:

Embodiment 1

The first video file includes image frames representing different angles of a same three-dimensional object, for example, a video file obtained by performing video shooting on a same three-dimensional object from different angles, or a video file obtained by composing a plurality of images obtained by performing video shooting on a same three-dimensional object from different angles. The preset factor is orientation data of a terminal.

Optionally, the orientation data of the terminal may be obtained by a motion sensor in the terminal. The motion sensor includes various sensors that can obtain the orientation data of the terminal, for example, a gravity sensor, an accelerometer, a gyroscope, and a compass (or a magnetometer). The orientation data may be obtained by a single type of sensor, or the orientation data of the terminal may be obtained by a combination of a plurality of sensors by using a sensor fusion algorithm. In addition, the orientation data may be values of the terminal on X, Y, and Z axes in a terminal coordinate system or a geographical coordinate system, or may be a deviation angle or an axial acceleration of the terminal relative to axes in a terminal coordinate system or a geographical coordinate system.

In this case, an embodiment of step 501 may be specifically implemented as: performing normalization processing on a value of the orientation data, to obtain normalized data; then mapping the value of the orientation data to [N1, N2] based on the normalized data; and generating, based on [N1, N2], a location parameter that is in the video file and that is of each image frame from an N1$^{th}$ frame to an N2$^{th}$ frame. N1 represents a sequence number of an onset frame, and N2 represents a sequence number of an end frame. Values of N1 and N2 may be the same, in other words, the orientation data is mapped to an (M=N1=N2)$^{th}$ image frame. In this case, it may be understood that, when the terminal is at a location, the terminal displays an image frame. When the terminal is switched to another location, the terminal displays another image frame. Alternatively, values of N1 and N2 may be different, in other words, the orientation data is mapped to an N1$^{th}$ frame to an N2$^{th}$ frame. It may be understood that, when the terminal is at a location, the terminal successively displays the N1$^{th}$ frame to the N2$^{th}$ frame. For example, when the terminal is at a first location, the terminal successively displays a first frame to a 15$^{th}$ frame, and when the terminal is switched to a location 2, the terminal successively displays a 16$^{th}$ frame to a 30$^{th}$ frame.

For example, the orientation data is specifically data that is of the terminal on the X axis, the Y axis, and the Z axis in the terminal coordinate system and that is obtained by using a gravity sensor. During obtaining of the orientation data, by invoking a particular function, such as a getSensorList(Sensor.TYPE_GRAVITY) function in the Android system, gravity data of the terminal in directions of the three axes of X, Y, and Z in the terminal coordinate system can be obtained by using the gravity sensor, and a value range of the gravity data is (−10, 10).

It should be noted that, the terminal coordinate system is a default coordinate system of the terminal, to be specific, when the terminal is placed in a default direction of the terminal, the X axis horizontally points to the right, the Y axis is vertically upward, and the Z axis points to an outside of a front of a screen, that is, for a back of the screen, values on the Z axis are negative. A status of the terminal is determined based on values of the obtained gravity data of the terminal in the directions of the three axes of X, Y, and Z. Using a mobile phone as an example, when a screen of the mobile phone is parallel to a horizontal plane, an obtained value on the X axis is 0, a value on the Y axis is 0, and a value on the Z axis is approximately 10 (where an actually obtained value may be a value close to 10, such as 9.81). When the mobile phone is placed on a desktop with the screen facing downward, an obtained value on the X axis is 0, a value of the Y axis is 0, and a value on the Z axis is approximately −10 (where an actually obtained value may be a value close to −10, such as −9.81). For specific implementation of the orientation data of the terminal obtained by using the gravity sensor, refer to the prior art. Details are not described herein.

After the gravity data of the terminal in the three directions of the X axis, the Y axis, and the Z axis is obtained by using the gravity sensor, normalization processing is performed on the obtained gravity data on the X axis according to the following formula (1):

$$\text{Normalized data} = \frac{X \text{ axis}}{C1} \quad (1)$$

C1 is a maximum value on the X axis, and is for normalizing the value on the X axis to [−1, 1].

Alternatively, normalization processing is performed on the obtained gravity data on the Y axis according to the following formula (2):

$$\text{Normalized data} = \frac{Y \text{ axis}}{C2} \quad (2)$$

C2 is a maximum value on the Y axis, and is for normalizing the value on the Y axis to [−1, 1].

Still alternatively, normalization processing is performed on the obtained gravity data on the Z axis according to the following formula (3):

$$\text{Normalized data} = \frac{Z \text{ axis}}{C3} \quad (3)$$

C3 is a maximum value on the Z axis, and is for normalizing the value on the Z axis to [−1, 1].

Assuming that all values on the X axis, the Y axis, and the Z axis are in an interval [−10, 10], the normalization processing is performed by using "10" as a reference. For example, when the gravity data in the three directions of the X axis, the Y axis, and the Z axis obtained by using the gravity sensor is respectively: 6.5, 10, and 10, the three pieces of data each are divided by 10, to obtain normalized data: 0.65, 1, and 1.

In a scenario in which the user vertically holds the terminal, orientation data on the X axis is mapped to an M1$^{th}$ frame according to the following formula (4) and based on the data on the X axis obtained after the normalization processing:

$$M1 = \frac{\text{Normalized data on the } X \text{ axis} \times N + N}{2} \quad (4)$$

The total frame quantity is a total quantity of image frames included in a video decoder. Assuming that the total frame quantity is 200 and the normalized data on the X axis is 0.65, a to-be-displayed image frame obtained according to the formula (4) is a 165$^{th}$ frame. Therefore, image frame data represented by the 165$^{th}$ frame may be obtained, or image frame data including the 165$^{th}$ frame and an image frame associated with or adjacent to the 165$^{th}$ frame may be obtained, and used as image frame data needing to be displayed, and then the image frame data is decoded and displayed.

In a scenario in which the user horizontally holds the terminal, the data on the Y axis may be further mapped to an M2$^{th}$ frame based on the data on the Y axis obtained after the normalization processing and according to the following formula (5):

$$M2 = \frac{\text{Normalized data on the } Y \text{ axis} \times N + N}{2} \quad (5)$$

Figure 5A:
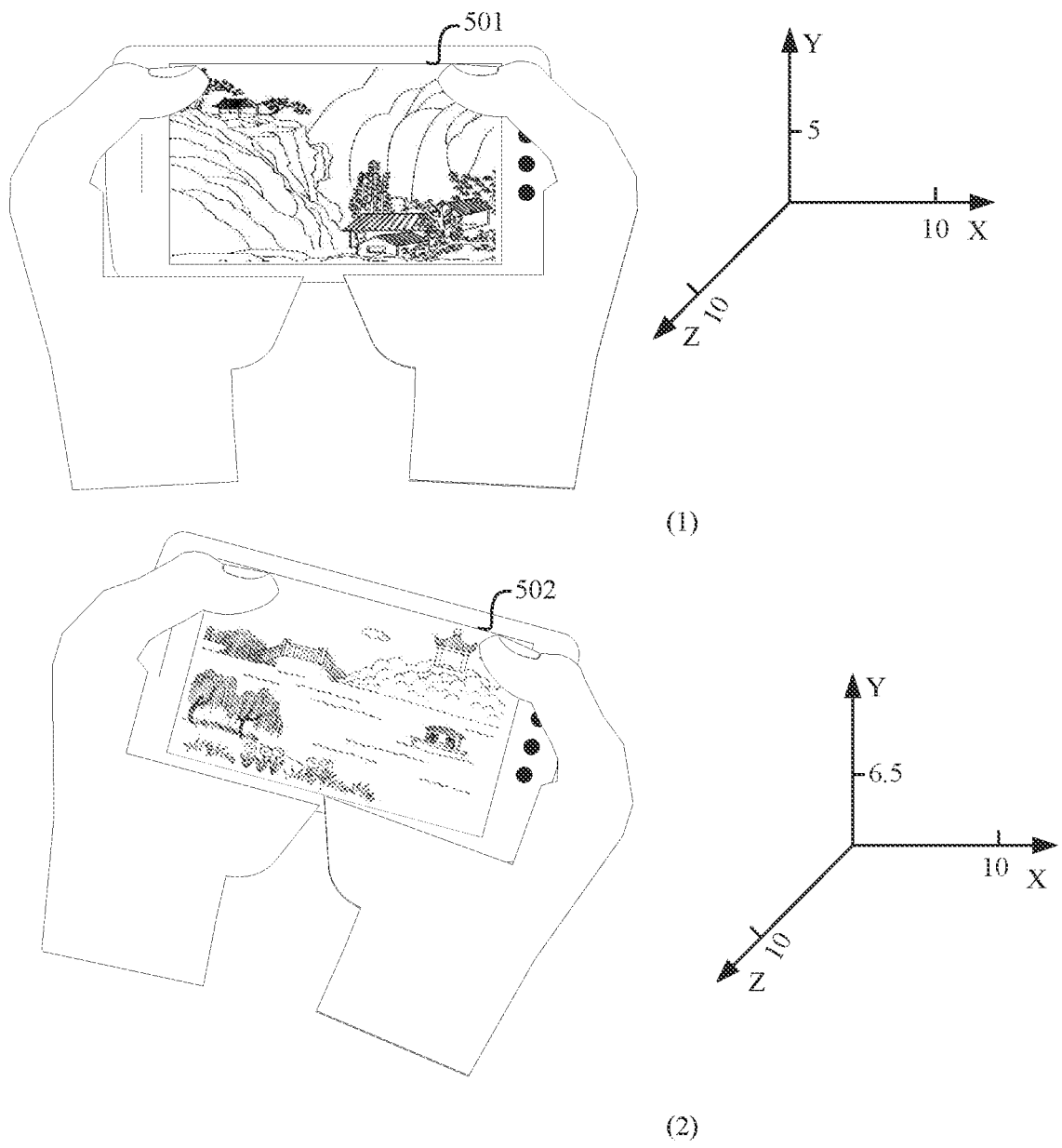
FIG. 5A and FIG. 5B are a schematic diagram of an interface on which a wallpaper displayed on a terminal changes with orientation data of the terminal according to an embodiment of this application.

For example, referring to FIG. 5A, when the user horizontally holds the terminal, as shown by (1) in FIG. 5A, the orientation data of the terminal is that X=10, Z=10, and Y=5, and in this case, a to-be-displayed image frame currently displayed on the terminal is shown by 501 in (1). As shown in (2) in FIG. 5A, the orientation data of the terminal is that X=10, Z=10, and Y=6.5, and a target image frame currently displayed on the terminal is shown by 502 in (2). The image frame 501 and the image frame 502 are different image frames.

Figure 5B:
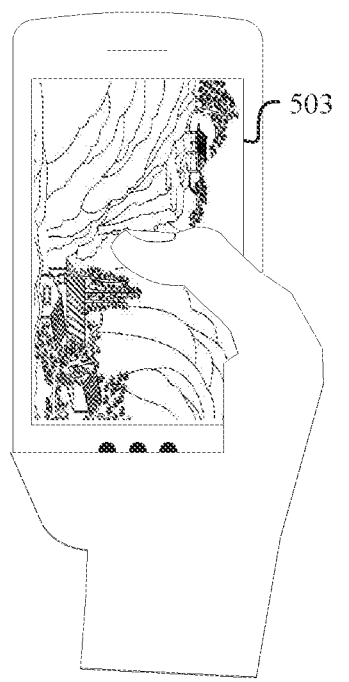
Figure 5B:
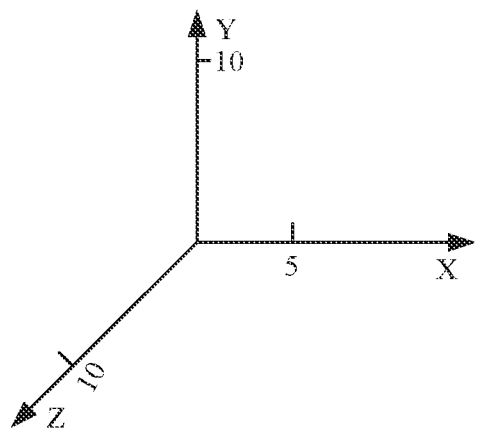
Figure 5B:
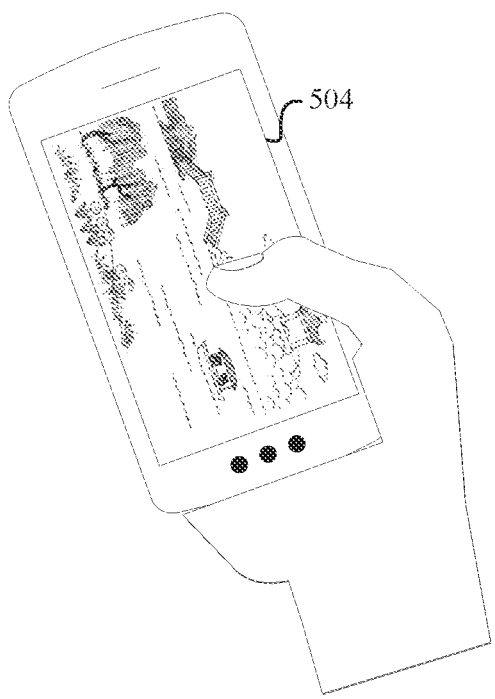
Figure 5B:
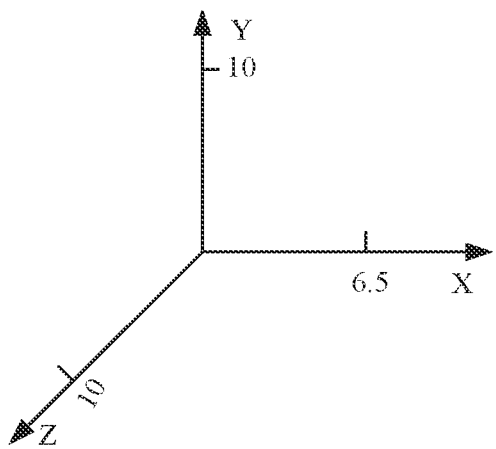

Referring to FIG. 5B, when the user vertically holds the terminal, as shown in (1) in FIG. 5B, the orientation data of the terminal is that X=5, Z=10, and Y=10, and in this case, a to-be-displayed image frame currently displayed on the terminal is shown by 503 in (1). As shown in (2) in FIG. 5B, the orientation data of the terminal is that X=6.5, Z=10, and Y=10, and a target image frame currently displayed on the terminal is shown by 504 in (2). The image frame 503 and the image frame 504 are different image frames.

Certainly, if the orientation data is a deviation angle from the preset coordinate axes in the coordinate system, normalization processing may still be performed on the deviation angle according to the following formula (6), to obtain normalized data:

$$\text{Normalized data} = \frac{\text{Deviation angle}}{C4} \quad (6)$$

C4 is a maximum value of the deviation angle, and is an angle constant for normalizing the deviation angle to an interval [−1, 1]. Assuming that all possible values of the deviation angle are in an interval [−90 degrees, 90 degrees], the normalization processing is performed by using "90 degrees" as a reference. After the normalized data is obtained, the deviation angle is mapped to an M3$^{th}$ frame of image according to a formula (7):

$$M3 = \frac{\text{Normalized data of the deviation angle} \times N + N}{2} \quad (7)$$

It can be learned that, according to this implementation 1, when the user uses the terminal in different postures, the gravity data obtained by the gravity sensor of the terminal changes accordingly, in other words, the orientation data obtained by the terminal changes accordingly. A location of the to-be-displayed image frame determined by the terminal changes accordingly, image frame data that is obtained by the terminal and that needs to be displayed changes accordingly, and the decoded and displayed image frame changes accordingly, thereby achieving the effect of the dynamic image.

Certainly, because the quantity of image frames included in the video file is limited, when an orientation change of the terminal is relatively small, the location of the to-be-displayed image frame obtained according to the formulas (4) to (7) does not change, in other words, the image frame currently displayed on the terminal does not change.

Embodiment 2

In this embodiment, the video file includes image frames representing different time points. For example, the video file is a video created from pictures obtained by shooting a same lake at different time points. The preset factor is time data, for example, may be a system time of the terminal.

In this case, determining, based on a value of the system time of the terminal, that a location that is of a to-be-displayed image frame and that is in the first video file includes:

performing normalization processing on a value of the system time according to the following formula (8), to obtain normalized data:

$$\text{Normalized data} = \frac{\text{System time}}{C5} \quad (8)$$

C5 is a constant used for normalizing the system time, and is specifically a maximum value of the system time. All possible values of the system time are between 0 o'clock and 24 o'clock, and therefore, normalization is performed by using 24 as a reference, in other words, a value of C5 is 24.

For example, when a current time point is 2:00 at early morning, the normalized data is $^{2}/_{24}$=0.08; when a current time point is 8:00 in the morning, the normalized data is $^{8}/_{24}$=0.33; or when a current time point is 18:00 at dusk, the normalized data is $^{18}/_{24}$=0.75. For a case in which a current time point is not the top of the hour, minutes are first converted into a decimal. If currently it is 18:25, 25 minutes may be converted into 0.42 hour. It may be understood that the current time point is 18.42 o'clock, and then the normalized data is obtained:

$$\frac{18.42}{24} = 0.77.$$

in an alternative manner, only the top of the hour may be used. For example, 8:01, 8:25, 8:47, and 8:59 are all counted as 8:00. Further, half an hour may be alternatively used as a line of demarcation, so that minutes shorter than half an hour are not used, and minutes longer than half an hour are counted as one hour. For example, 8:01 and 8:25 are counted as 8:00, and 8:47 and 8:59 are counted as 9 o'clock.

After the normalized time data is obtained according to the formula (8), the system time is mapped to an $[N3, N4]^{th}$ image frame based on the normalized time data. N3 represents a sequence number of an onset frame, and N4 represents a sequence number of an end frame. Values of N3 and N4 may be the same, in other words, the orientation data is mapped to an (M=N3=N4)th image frame. In this case, it may be understood that, when the system time of the terminal is a time, the terminal displays an image frame. When a time of the terminal is changed to another time, the terminal displays another image frame. Alternatively, values of N3 and N4 may be different, in other words, the orientation data is mapped to an $N3^{th}$ frame to an $N4^{th}$ frame. It may be understood that, when the system time of the terminal is a time, the terminal successively displays the $N3^{th}$ frame to the $N4^{th}$ frame. For example, when the system time of the terminal is 8 o'clock, the terminal successively displays a first frame to a $15^{th}$ frame, and when the system time is switched to 9 o'clock, the terminal successively displays a $16^{th}$ frame to a $30^{th}$ frame.

When the system time is mapped to an $M4^{th}$ frame, a value of M4 may be obtained according to the following formula (9):

$$M4 = \text{Normalized data} \times N \quad (9)$$

For example, if the total frame quantity is 200, the current time is 2:00 at early morning, and the obtained normalized data is 0.08, the to-be-displayed image frame obtained based on the formula (9) is the $16^{th}$ frame.

Optionally, a total frame quantity of the first video file is an integer multiple of 24 (1*24, 2*24, ..., and n*24 frames, where n is a positive integer), or a quotient of 24 (a number that may be exactly divided by 24, such as 2, 3, 4, 6, 8, or 12, in other words, a frame quantity is 24/2=12 frames, or 24/3=8 frames). Using an example in which the frame quantity is twice of 24 (48 frames), a wallpaper is changed twice every hour, and is changed to another one every half an hour. Using an example in which the frame quantity is a half of 24 (the quotient is 2), a wallpaper is changed once every two hours.

Certainly, in another implementation, as self-defined by the user, the value of the system time may be alternatively mapped to an $N5^{th}$ frame to an $N6^{th}$ frame in the video file. For example, assuming that a total frame quantity N of the video file is 100, based on a user setting, one o'clock may be mapped to a first frame to a $20^{th}$ frame, two o'clock may be mapped to a $21^{th}$ frame to a $25^{th}$ frame, and three o'clock may be mapped to the $25^{th}$ frame to a $34^{th}$ frame. In this case, if it is detected that the current time is changed to three o'clock, a standardization operation is performed on data of three o'clock, to obtain a total of 10 location parameters: 25 to 34, and then the $25^{th}$ image frame to the $34^{th}$ image frame are displayed as the dynamic image based on the 10 location parameters.

Figure 6:
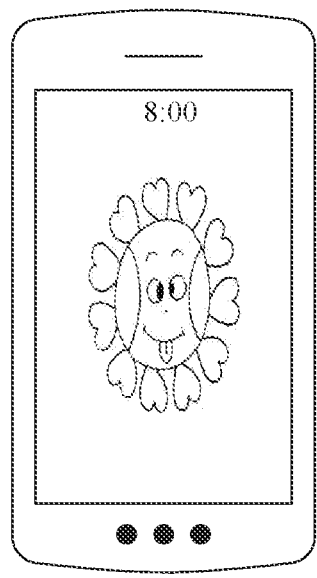
FIG. 6 is a schematic diagram of an interface on which a wallpaper displayed on a terminal changes with a system time of the terminal according to an embodiment of this application.
Figure 6:
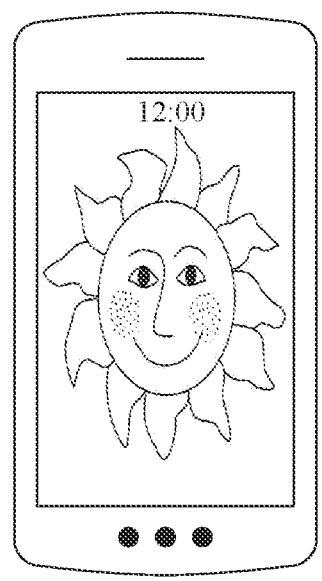
Figure 6:
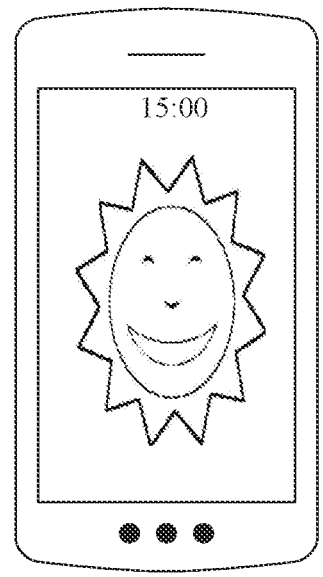
Figure 6:

For example, (1) to (4) in FIG. 6 respectively show image frames currently displayed on the terminal when the system time of the terminal is 8:00, 12:00, 15:00, and 19:00.

It can be learned that, according to embodiments of this implementation, different image frames can be displayed at different time points, in other words, the display effect of the dynamic image can be achieved.

Embodiment 3

The video file includes image frames representing different weather. For example, the video file is obtained by composing pictures shot in different weather. In the video file, a first frame to a $10^{th}$ frame represent image frames on a sunny day, an $11^{th}$ frame to a 20th frame represent image frames on a rainy day, and a $21^{th}$ frame to a $30^{th}$ frame represent image frames on an overcast day. The preset factor is weather data obtained by the terminal.

In this case, the terminal may determine a location of a to-be-displayed image based on the weather data, and obtain corresponding image frame data. For example, on the sunny day, image frame data including the first frame to the $10^{th}$ frame is obtained, and decoded for display. When the weather changes from sunny to overcast, image frame data including the $11^{th}$ frame to the $20^{th}$ frame is obtained, and decoded for display.

According to this embodiment 3, the different image frames can be displayed in different weather conditions, thereby achieving the effect of the dynamic image.

In all of the foregoing embodiments, an example in which the preset factor is a single factor, namely, orientation data, a time, or weather, is used. During actual application, the preset factor may be a combination of any two or three of factors such as an orientation, a time, or weather. Therefore, the following embodiment 4 may be further implemented.

Embodiment 4

The preset factor includes a combination of orientation data and time data.

In implementations of this embodiment, when the terminal is located at a current orientation and the system time is a first time, the display displays a first image frame, and the first image frame corresponds to the first time. When the terminal rotates from the current orientation along a first direction, the display displays a second image frame, the second image frame corresponds to a second time, and the second time is earlier than the first time. When the terminal rotates from the current orientation along a second direction, the display displays a third image frame, the third image frame corresponds to a third time, and the third time is later than the first time.

Figure 7:
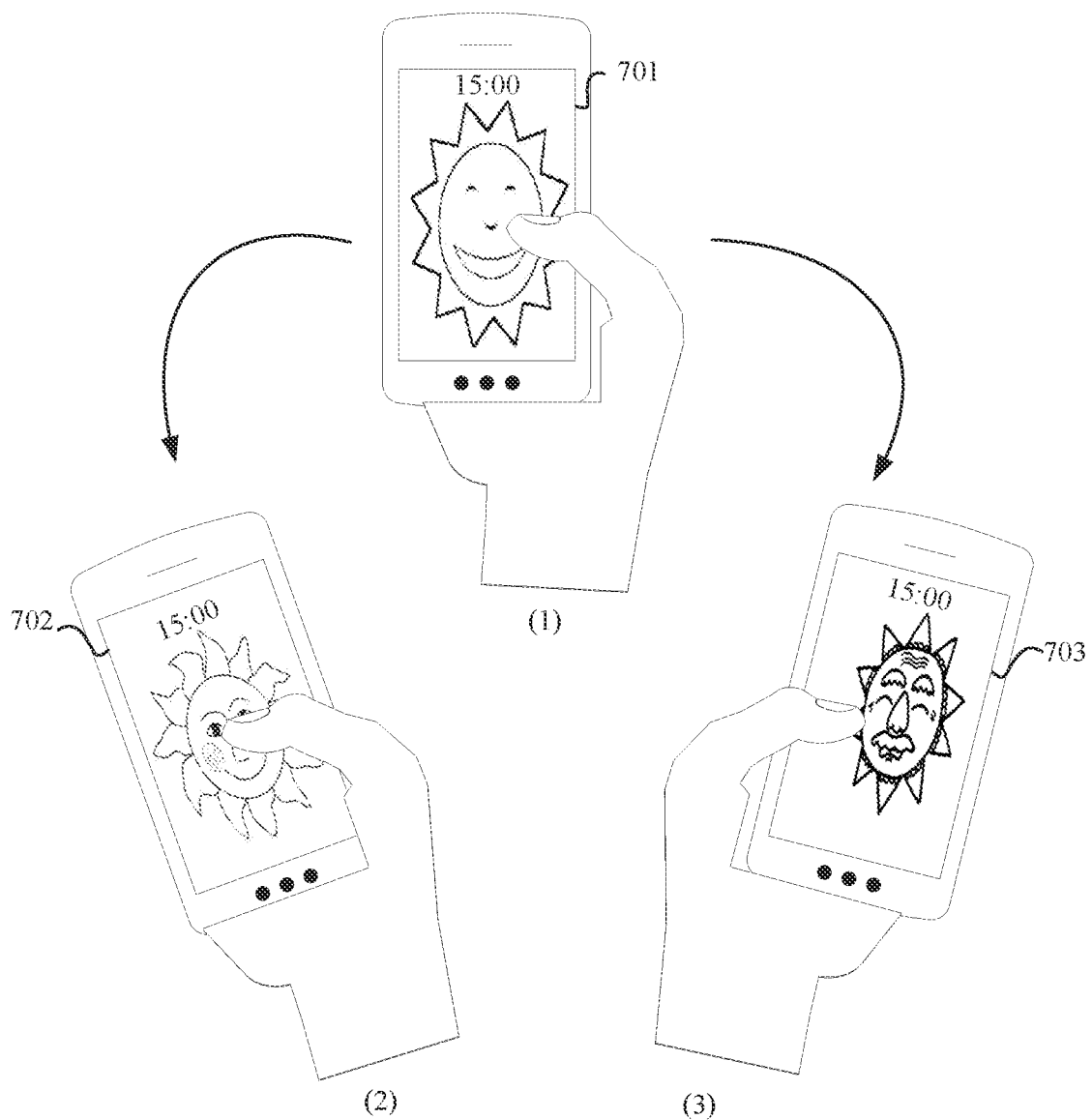
FIG. 7 is a schematic diagram of an interface on which a wallpaper displayed on a terminal changes with an orientation and a time point of the terminal according to an embodiment of this application.

For example, referring to FIG. 7, as shown in (1) in FIG. 7, the current orientation of the terminal is a first orientation, and a current time is 15:00. In this case, an image frame 701 corresponding to 15:00 is displayed. When the user rotates the terminal to the left from the first orientation, an image frame 702 shown in (2) in FIG. 7 is displayed, and the image frame 702 corresponds to a time before 15:00, for example, corresponds to 12:00. When the user rotates the terminal to the right from the first orientation, an image frame 703 shown in (3) in FIG. 7 is displayed, and the image frame 703 corresponds to a time after 15:00, for example, corresponds to 19:00.

Certainly, which decoded frame of image is specifically the to-be-displayed image frame currently displayed on the terminal may be further affected by another factor in addition to the factors such as the orientation, the time, and the weather.

A dynamic wallpaper includes a single-layer wallpaper and a double-layer wallpaper. The single-layer wallpaper means that the wallpaper includes only a background layer. The double-layer wallpaper means that the wallpaper includes not only a background layer, but also a cover layer overlaid on the background layer. For the single-layer wallpaper, the background layer of the single-layer wallpaper may be implemented by using the video file. For a double-layer dynamic image, the background layer may be implemented by using a static picture, and the cover layer may be implemented by using a dynamic image, or the two layers may be both implemented by using dynamic images. Therefore, a dynamic wallpaper may include a first video file, or may include a first dynamic image and a background picture, or may include a first dynamic image and a second dynamic image. For different implementations of the dynamic wallpapers, step 303 may specifically include the following display manners:

Display Manner 1:

The terminal displays, on a static picture in an overlaying manner, at least one image frame obtained by decoding a first video file. The static picture is the background layer of the dynamic wallpaper, and the to-be-displayed image frame is the cover layer of the dynamic wallpaper.

Figure 8A:
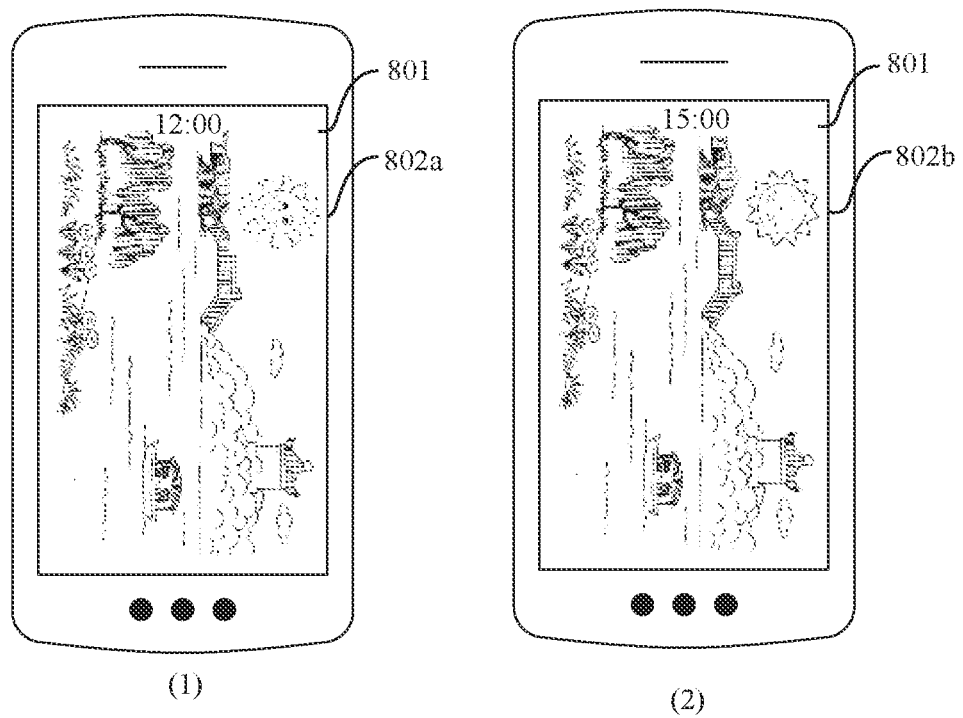
FIG. 8A is a schematic diagram of an interface for a double-layer dynamic wallpaper according to an embodiment of this application.

Referring to (1) and (2) in FIG. 8A, a wallpaper currently displayed on the terminal is a double-layer dynamic wallpaper, a background layer of the double-layer dynamic wallpaper is a static picture 801, and an image frame overlaid on the static picture 801 changes as a time changes. For example, when the system time is 12:00, an image frame 802a in (1) is displayed, and when the system time is 15:00, an image frame 802b in (2) is displayed.

Display Manner 2:

The at least one dynamic image corresponding to the dynamic wallpaper includes a first dynamic image and a second dynamic image. In this case, during display of the dynamic wallpaper, at least one image frame obtained by decoding the second dynamic image may be displayed, in an overlaying manner on an image frame obtained by decoding image frame data obtained from the first dynamic image. An image frame obtained by decoding the first dynamic image is the background layer of the dynamic wallpaper, and the at least one image frame obtained by decoding the second dynamic image is the cover layer of the dynamic wallpaper.

In this embodiment 2, the background layer and the cover layer of the dynamic wallpaper are both implemented by using the dynamic images. Optionally, no matter whether the first dynamic image or the second dynamic image is displayed, the method shown above may be used to determine and display the to-be-displayed image frame. Alternatively, frames of the second dynamic image or the first dynamic image are successively displayed based on a preset time interval. In other words, the to-be-displayed image frame is not determined by the preset factor.

Figure 8B:
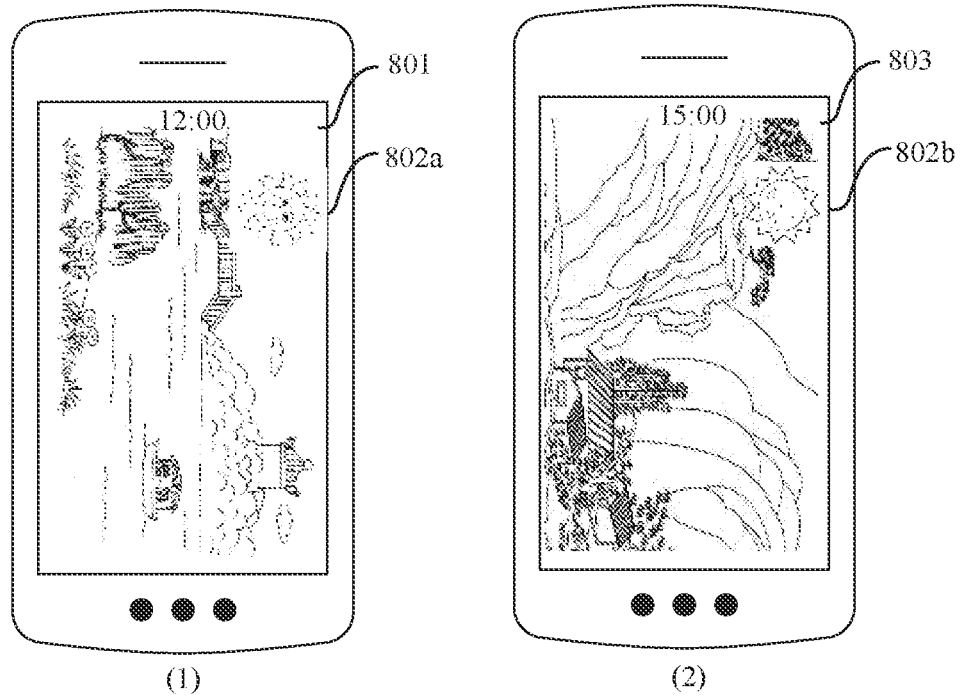
FIG. 8B is a schematic diagram of another interface for a double-layer dynamic wallpaper according to an embodiment of this application.

Referring to (1) and (2) in FIG. 8B, the background layer and the cover layer of the dynamic wallpaper currently displayed on the terminal are both continuously switched. Specifically, when the system time of the terminal is 12:00, the background layer is an image frame 801, and the cover layer is the image frame 802a. When the system time of the terminal is 15:00, the background layer is switched to an image frame 803, and the cover layer is switched to the image frame 802b. In the double-layer dynamic image, the cover layer is affected by a time, and a displayed image frame corresponds to the time. The background layer may not be affected by a current time, and may be successively played frame by frame. Certainly, the background layer may be alternatively affected by a current time, and displays an image frame corresponding to the current time. Conversely, the background layer may alternatively be affected by a time, and the cover layer may be successively played frame by frame.

The foregoing describes the solutions provided in the embodiments of this application, mainly from a perspective of a process of displaying a dynamic image by the terminal. It may be understood that, to implement the foregoing functions, the terminal includes corresponding functional modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The methods shown in the foregoing method embodiments may be implemented by a terminal 200 shown in FIG. 2. Specifically, a memory 220 stores one or more pieces of program code and at least one video file that is used for implementing a dynamic image. The one or more pieces of program code include an instruction, and may be stored in a program storage area of the memory 220. The at least one video file is stored in a data storage area, such as a secure digital memory card (SD), of the memory 220. Therefore, when a dynamic image needs to be displayed, the processor 230 performs step 301 to obtain image frame data, and then sends the image frame data to a video decoder 282. The video decoder 282 performs step 302, to obtain at least one image frame through decoding, and sends the at least one image frame to a display 260 for display.

When the video decoder 282 decodes the image frame data to obtain the at least one image frame, on the one hand, the video decoder 282 may send the at least one image frame to the display for display. On the other hand, a GPU may perform image processing on a to-be-displayed image frame, and then send the to-be-displayed image frame to the display for display.

For specific processes and effects of performing the foregoing method embodiments by the terminal 200, refer to the foregoing method embodiments. Details are not described herein again.

Certainly, division may be further performed for the terminal based on the foregoing method examples. For example, each module or unit may be divided based on each function, or two or more functions may be integrated into one processing module. The foregoing integrated module may be implemented in a form of hardware, or may be implemented in a form of a software module or unit. In this embodiment of this application, module or unit division is an example, and is merely a logical function division. In actual implementation, another division manner may be used.

Figure 9:
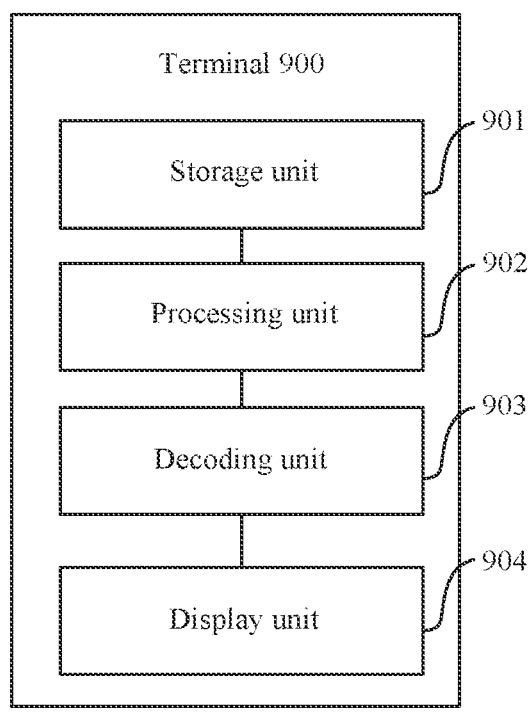
FIG. 9 is a schematic structural diagram of a terminal according to an embodiment of this application.

FIG. 9 is a possible schematic structural diagram of the terminal provided in the foregoing embodiments. The terminal 900 includes a storage unit 901, a processing unit 902, a decoding unit 903, and a display unit 904.

The storage unit 901 is configured to store one or more pieces of program code and at least one video file that is used for implementing a dynamic image. The processing unit 902 is configured to perform step 301 shown in FIG. 3, steps 401 and 402 shown in FIG. 4, steps 3011 and 3012 in FIG. 5, and/or another process used for the technology described in this specification. The decoding unit 903 is configured to perform step 302 shown in FIG. 3, and the display unit 904 is configured to perform step 303 shown in FIG. 3.

Certainly, the terminal 900 includes but is not limited to the units and modules listed in the foregoing. For example, the terminal 900 may further include a sending unit configured to send data or a signal to another device, a receiving unit configured to receive data or a signal sent by another device, and the like. In addition, functions that can be specifically implemented by the foregoing units also include but are not limited to functions corresponding to the steps in the methods in the foregoing instances. For detailed descriptions of another unit of the terminal 900 and the units of the terminal 900, refer to the detailed descriptions of the steps in the corresponding methods thereof. Details are not described herein again in this embodiment of this application.

Optionally, the storage unit 901 may be implemented by being included in the memory 220 in the terminal 200, and the processing unit 902 may be implemented by being included in the processor 230 in the terminal 200. The display unit 904 may be implemented by being included in the display 260 in the terminal 200. The decoding unit 903 may be implemented by being included in the video decoder 282 in the terminal 200.

An embodiment of this application further provides a computer storage medium. The computer storage medium stores computer program code. When one or more processors of a terminal perform the computer program code, the terminal performs the methods for displaying a dynamic image in the method embodiments shown in FIG. 3 and FIG. 4.

An embodiment of this application further provides a computer program product. When the computer program product is run on a computer, the computer is enabled to perform the methods for displaying a dynamic image in the method embodiments shown in FIG. 3 and FIG. 4.

The terminal 200, the terminal 900, the computer storage medium, and the computer program product provided in the embodiments of this application are all configured to perform the corresponding methods provided in the foregoing. Therefore, for beneficial effects that they can achieve, refer to beneficial effects in the corresponding methods provided in the foregoing. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, mutual couplings or direct couplings or communication connections between the units may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for displaying a dynamic image, performed by a terminal, wherein the method comprises:
   obtaining one or more location parameters according to a value of a preset factor, wherein the one or more location parameters indicate locations that are in a video file and that are of a plurality of image frames, and the value is a normalized value generated from the value of the preset factor;
   obtaining, based on the one or more location parameters, a plurality of pieces of image frame data in a one-to-one correspondence to the plurality of image frames, wherein the dynamic image comprises the plurality of image frames, and the preset factor comprises at least one of the following factors: a system time of the terminal, orientation data, or weather data that is obtained by the terminal, wherein the video file comprises at least one of the following image frames: image frames representing different time points, image frames representing different angles of a three-dimensional object, or image frames representing different weather;

obtaining the plurality of image frames from the plurality of pieces of image frame data; and displaying the plurality of image frames, to present the dynamic image.

2. The method according to claim 1, wherein the obtaining, based on the one or more location parameters, the plurality of pieces of image frame data in the one-to-one correspondence to the plurality of image frames further comprises:

successively obtaining one piece of image frame data from the video file in a preset sequence based on the preset factor;

correspondingly, the obtaining the plurality of image frames from the plurality of pieces of image frame data comprises:

when obtaining one piece of image frame data each time, decoding the obtained image frame data to successively obtain the plurality of image frames, and correspondingly, the displaying the plurality of image frames, to present the dynamic image comprises:

when obtaining one image frame through the decoding each time, displaying the obtained image frame, and successively displaying all the image frames, to present the dynamic image.

3. The method according to claim 2, wherein the displaying the plurality of image frames, to present the dynamic image comprises:

after displaying a first image frame, obtaining, from the video file in the preset sequence, second image frame data corresponding to a second image frame;

decoding the second image frame data, to obtain the second image frame; and displaying the second image frame, and successively displaying all the image frames, to present the dynamic image.

4. The method according to claim 1, wherein the obtaining one or more location parameters according to the value of the preset factor comprises:

mapping the normalized value of the preset factor to a range [0, N], wherein N is a quantity of image frames comprised in the video file, and wherein N is a positive integer; and generating the one or more location parameters based on a result after the mapping.

5. The method according to claim 4, wherein the video file comprises image frames representing different angles of a three-dimensional object, the preset factor comprises orientation data, and the mapping the value of the preset factor to the range [0, N] comprises:

performing normalization processing on a value of the orientation data to obtain normalized data; and mapping the value of the orientation data to [N1, N2] based on the normalized data, wherein N1 represents a sequence number of an onset frame, and N2 represents a sequence number of an end frame; and the generating the one or more location parameters based on the result after the mapping comprises:

generating, based on [N1, N2], a location parameter that is in the video file and that is of each image frame from an $N1^{th}$ frame to an $N2^{th}$ frame.

6. The method according to claim 5, wherein the orientation data comprises values of the terminal on X, Y, and Z axes in a preset coordinate system, and the performing normalization processing on the orientation data to obtain normalized data comprises:

performing normalization processing on the value on the X axis in the orientation data according to the following formula, to obtain normalized data:

$$\text{Normalized data} = \frac{X \text{ axis}}{C1},$$

wherein C1 is a maximum value on the X axis; or performing normalization processing on the value on the Y axis in the orientation data according to the following formula to obtain normalized data:

$$\text{Normalized data} = \frac{Y \text{ axis}}{C2},$$

wherein C2 is a maximum value on the Y axis; or performing normalization processing on the value on the Z axis in the orientation data according to the following formula to obtain normalized data:

$$\text{Normalized data} = \frac{Z \text{ axis}}{C3},$$

wherein C3 is a maximum value on the Z axis.

7. The method according to claim 6, wherein the orientation data further comprises a deviation angle that is of the terminal and that is from a preset coordinate axes in the preset coordinate system, and the performing normalization processing on the orientation data to obtain normalized data comprises:

performing normalization processing on the deviation angle according to the following formula to obtain normalized data:

$$\text{Normalized data} = \frac{\text{Deviation angle}}{C4},$$

wherein C4 is a maximum value of the deviation angle.

8. The method according to claim 6, wherein the orientation data is obtained by a motion sensor of the terminal, and the motion sensor comprises either of the following sensors: a gyroscope and a gravity sensor.

9. The method according to claim 4, wherein the video file comprises image frames representing different time points, the preset factor comprises the system time of the terminal, and the mapping the value of the preset factor to the range [0, N] comprises:

performing normalization processing on a value of the system time according to the following formula to obtain normalized data:

$$\text{Normalized data} = \frac{\text{System time}}{C5},$$

wherein C5 is a maximum value of the system time; and mapping the value of the system time to [N3, N4] based on the normalized data, wherein N3 represents a sequence number of an onset frame, and N4 represents a sequence number of an end frame; and the generating the one or more location parameters based on the result after the mapping comprises:

generating, based on [N3, N4], a location parameter that is in the video file and that is of each image frame from an N3$^{th}$ frame to an N4$^{th}$ frame.

10. The method according to claim 1, wherein the obtained plurality of image frames are consecutive image frames.

11. The method according to claim 1, wherein when the preset factor satisfies a preset change condition, the obtaining, from the video file based on the preset factor, the plurality of pieces of image frame data in the one-to-one correspondence to the plurality of image frames is performed.

12. The method according to claim 1, further comprising:
decoding the image frame data using a hardware-based video decoder, to obtain the plurality of image frames.

13. A terminal, comprising:
a processor, a memory, a display, a video decoder, and a bus, wherein the processor, the memory, the display, and the video decoder communicate with each other by using the bus, wherein the memory stores one or more pieces of program code and at least one video file for implementing a dynamic image, wherein the one or more pieces of program code comprise an instruction, and when the instruction is executed by the processor, the terminal performs operations, comprising:

obtaining, by the processor, one or more location parameters according to a value of a preset factor, wherein the one or more location parameters indicate locations that are in a video file and that are of a plurality of image frames, and the value is a normalized value generated from the value of the preset factor;

obtaining, based on the one or more location parameters, a plurality of pieces of image frame data in a one-to-one correspondence to the plurality of image frames, wherein the dynamic image comprises the plurality of image frames, and the preset factor comprises at least one of the following factors: a system time of the terminal, orientation data, or weather data that is obtained by the terminal, wherein the video file comprises at least one of the following image frames: image frames representing different time points, image frames representing different angles of a three-dimensional object, or image frames representing different weather;

obtaining the plurality of image frames from the plurality of pieces of image frame data; and displaying the plurality of image frames, to present the dynamic image.

14. The terminal according to claim 13, wherein
the processor is configured to successively obtain one piece of image frame data from the video file in a preset sequence based on the preset factor;

the video decoder is configured to: when obtaining one piece of image frame data each time, decode the obtained image frame data to successively obtain the plurality of image frames; and the display is configured to: when obtaining one image frame through the decoding each time, display the obtained image frame, and successively display all the image frames to present the dynamic image.

15. The terminal according to claim 14, wherein
the processor is configured to: after the display displays a first image frame, obtain, from the video file in the preset sequence, second image frame data corresponding to a second image frame;

the video decoder is configured to: decode the second image frame data, to obtain the second image frame; and the display is configured to: display the second image frame, and successively display all the image frames, to present the dynamic image.

16. The terminal according to claim 13, wherein the processor is further configured to:

map the normalized value of the preset factor to a range [0, N], wherein N is a quantity of image frames comprised in the video file, and wherein N is a positive integer; and generate the one or more location parameters based on a result after the mapping.

17. The terminal according to claim 16, wherein the video file comprises image frames representing different angles of a three-dimensional object, the preset factor comprises orientation data, and the processor is further configured to:

perform normalization processing on a value of the orientation data, to obtain normalized data;

map the value of the orientation data to [N1, N2] based on the normalized data, wherein N1 represents a sequence number of an onset frame, and N2 represents a sequence number of an end frame; and generate, based on [N1, N2], a location parameter that is in the video file and that is of each image frame from an N1$^{th}$ frame to an N2$^{th}$ frame.

18. The terminal according to claim 13, wherein the video decoder is a hardware-based video decoder.

19. The terminal according to claim 13, wherein the plurality of image frames obtained by the processor are consecutive image frames.

20. The terminal according to claim 13, wherein the processor is further configured to:

when the preset factor satisfies a preset change condition, obtain, from the video file based on the preset factor, the plurality of pieces of image frame data in the one-to-one correspondence to the plurality of image frames.

21. A non-transitory computer readable storage medium, wherein the non-transitory computer readable storage medium stores an instruction, wherein when the instruction is run on a terminal, the terminal performs operations, comprising:

obtaining, one or more location parameters according to a value of a preset factor, wherein the one or more location parameters indicate locations that are in a video file and that are of a plurality of image frames, and the value is a normalized value generated from the value of the preset factor;

obtaining, based on the one or more location parameters, a plurality of pieces of image frame data in a one-to-one correspondence to the plurality of image frames, wherein the dynamic image comprises the plurality of image frames, and the preset factor comprises at least one of the following factors: a system time of the terminal, orientation data, or weather data that is obtained by the terminal, wherein the video file comprises at least one of the following image frames: image frames representing different time points, image frames representing different angles of a three-dimensional object, or image frames representing different weather, obtaining the plurality of image frames from the plurality of pieces of image frame data; and displaying the plurality of image frames, to present the dynamic image.

\* \* \* \* \*